(12) United States Patent
Klemm

(10) Patent No.: US 8,001,680 B2
(45) Date of Patent: Aug. 23, 2011

(54) MULTI-FLEXIBLE MANUFACTURING PLANT FOR ASSEMBLIES, TO BE JOINED TOGETHER FROM SEVERAL PRE-FABRICATED PARTS, OF VEHICLE BODIES

(75) Inventor: Thomas Klemm, Heimbach (DE)

(73) Assignee: ThyssenKrupp Drauz Nothelfer GmbH, Heilbronn (DE)

( * ) Notice: Subject to any disclaimer, the term of this patent is extended or adjusted under 35 U.S.C. 154(b) by 1097 days.

(21) Appl. No.: 11/766,542

(22) Filed: Jun. 21, 2007

(65) Prior Publication Data

US 2008/0052895 A1 Mar. 6, 2008

(30) Foreign Application Priority Data

Jun. 29, 2006 (DE) .................... 10 2006 030 427

(51) Int. Cl.
*B23P 21/00* (2006.01)
(52) U.S. Cl. ...................................................... 29/783
(58) Field of Classification Search .................... 29/783, 29/787, 791, 809, 711, 721, 771, 785, 784, 29/33 P; 901/2
See application file for complete search history.

(56) References Cited

U.S. PATENT DOCUMENTS

| | | | | |
|---|---|---|---|---|
| 6,612,011 B2 * | 9/2003 | Mayr et al. | | 29/430 |
| 7,322,510 B2 * | 1/2008 | Kraus | | 228/4.1 |
| 7,331,439 B2 * | 2/2008 | Degain et al. | | 198/339.1 |
| 2001/0003861 A1 | 6/2001 | Mayr et al. | | 29/407.04 |
| 2006/0226197 A1 | 10/2006 | Degain et al. | | 228/49.6 |
| 2008/0006675 A1 | 1/2008 | Kraus | | 228/49.2 |

FOREIGN PATENT DOCUMENTS

| | | |
|---|---|---|
| DE | 41 11 545 A1 | 10/1992 |
| DE | 298 13 669 U1 | 1/2000 |
| DE | 202 11 755 U1 | 1/2004 |
| DE | 203 04 022 U1 | 8/2004 |
| EP | 1 147 974 A2 | 10/2001 |

* cited by examiner

*Primary Examiner* — John C Hong
(74) *Attorney, Agent, or Firm* — Proskauer Rose LLP

(57) ABSTRACT

A manufacturing plant, in accordance with one embodiment, includes a turntable, interchangeable pick-up, and clamping devices for assemblies at several working locations. The pick-up and clamping devices are assigned at least one processing robot, set up for joining operations, which performs the joining operations on the assemblies held by the pick-up and clamping devices. The turntables 1, 2 are assigned interchange stations, with which the pick-up and clamping devices on turntables can be replaced by others. The interchange stations are preferably designed as turntables with different storage locations for the pickup and clamping devices to be replaced. The different pick-up and clamping devices needed for processing various types of assemblies as well as grippers for the handling robots are introduced exclusively from outside in exactly the same way as the pre-fabricated parts being processed, if a change from one type of assemblies to another type is required.

9 Claims, 1 Drawing Sheet

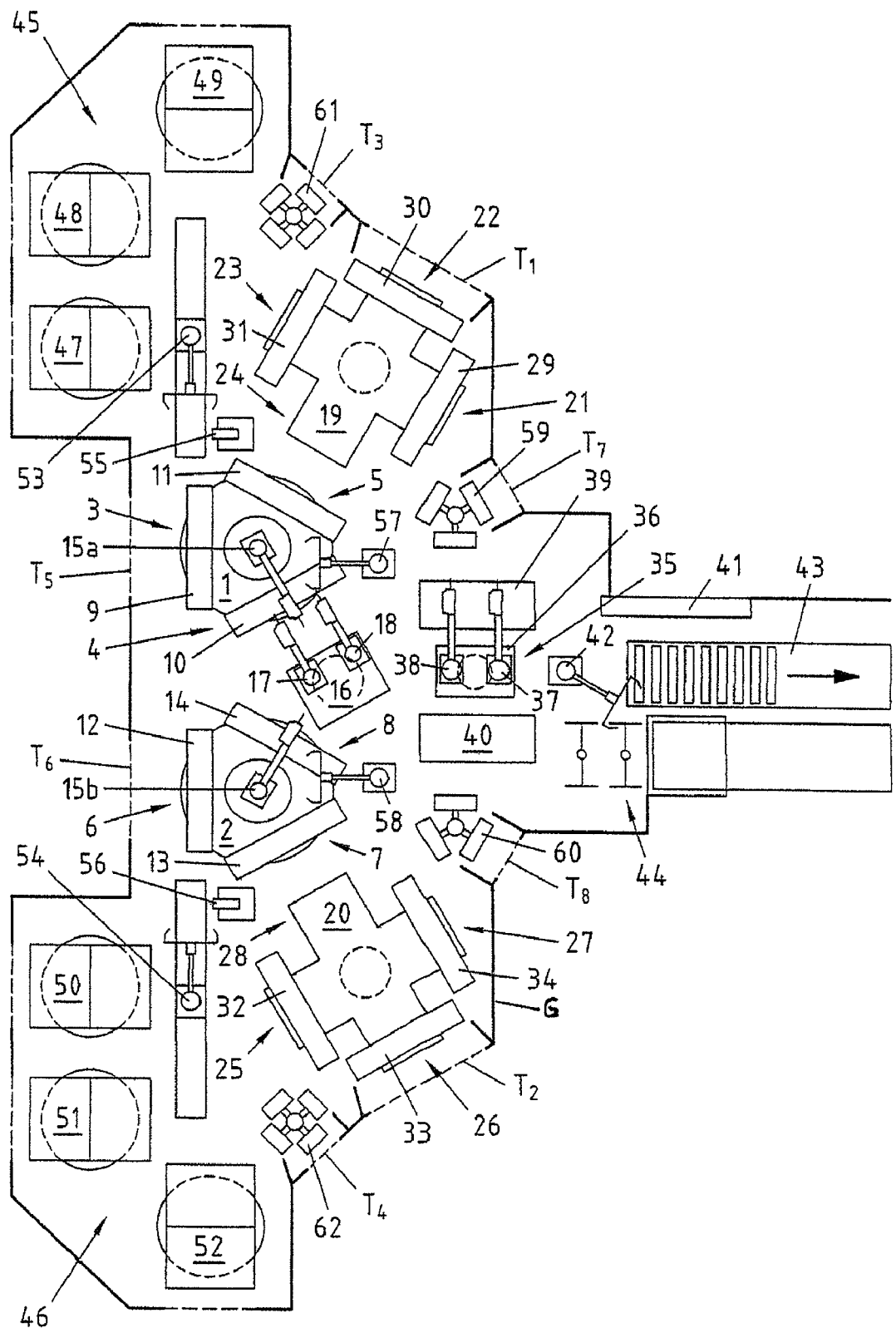

MULTI-FLEXIBLE MANUFACTURING PLANT FOR ASSEMBLIES, TO BE JOINED TOGETHER FROM SEVERAL PRE-FABRICATED PARTS, OF VEHICLE BODIES

CROSS-REFERENCE TO RELATED APPLICATIONS

This application claims benefit of priority to German Application No. DE 10 2006 030 427.6-21, filed Jun. 29, 2006, which is owned by the assignee of the instant application. The disclosure of German Application No. DE 10 2006 030 427.6-21 is incorporated herein by reference in its entirety.

FIELD OF THE INVENTION

In general, in one embodiment the invention relates to a multi-flexible manufacturing plant for assemblies, to be joined together from several pre-fabricated parts, of vehicle bodies.

BACKGROUND

It is a well-known fact that manufacturing plants designed for a particular type of vehicle only achieve their full potential, when a new model is introduced, after a certain start-up phase and, when a model change is imminent, operate at less than full capacity. Such operation of a manufacturing plant is not economical. Therefore there are considerations as to how the economy of the manufacturing plant can be improved in the startup phase and final phase of a vehicle model.

Furthermore it is only possible, to a quite limited extent, to run a manufacturing plant with different vehicle models or pre-fabricated part types (in the following abbreviated to "types"). In order to run a manufacturing plant at full capacity it would therefore also be desirable to use it to produce a mix of different types.

Processing a free mix of different pre-fabricated part types is possible to a limited extent with a known manufacturing plant (DE 298 13 669 U1). With this manufacturing plant the different pre-fabricated part types are supplied via pre-fabricated part feeders arranged separately next to each other or one above the other. By means of a multi-axial handling robot the prefabricated part types are transferred onto individual dollies, which can move to and fro transverse to the material flow direction, so that a dolly with one type of pre-fabricated part is located in each case at a workstation, while the other or others are in quiescent position. Each type of pre-fabricated part is held centrally in a lower tool on the dolly, which having an upper tool designed as gripper forms a clamping device. The gripper is detachably connected to a robot. The space requirement of such a manufacturing plant depends on the number of pre-fabricated part types to be processed. In addition a great amount of space is needed for the transverse movement of the dollies. For this reason the simultaneous mixed production of a plurality of pre-fabricated part types in such a manufacturing plant is possible with reasonable technical expenditure and floor space requirement.

In another known manufacturing plant for different prefabricated part types (DE 203 04 022 U1) processing stations, which in each case have several working locations for different pre-fabricated part types, are arranged along a transfer line. In order to be able to carry out work on the pre-fabricated parts at these various working locations, processing robots are displaceably arranged on axes of travel along the transfer line. Handling robots with which the prefabricated parts can be fed to and removed from the different working stations are also displaceably arranged on these axes of travel. With this manufacturing plant a great amount of floor space for the processing robots, arranged displaceably along the axis of travel, and working locations for the different pre-fabricated part types is needed. Although the majority of pre-fabricated part types can be processed through a correspondingly large number of workstations, the floor space needed for this is very great.

SUMMARY OF THE INVENTION

In one embodiment, the invention provides a multi-flexible manufacturing plant for assemblies of vehicle bodies, which permits simultaneous production of different models.

In accordance with an embodiment of the invention, a multi-flexible manufacturing plant for assemblies, to be joined together from several pre-fabricated parts, of vehicle bodies or body components includes a turntable, on which pick-up and clamping devices for similar or various types of assemblies are interchangeably arranged at several working locations, having an interchange station located next to the turntable, with which a pick-up and a clamping device for a first type of assembly is arranged on the turntable, so it can be replaced by a pick-up and clamping device for another type of assembly. The plant has several processing robots for joining operations and several processing robots, which can be fitted with grippers for specific types of pre-fabricated parts in order to draw pre-fabricated parts from pre-fabricated part magazines and to load and unload the pick-up and clamping device with these pre-fabricated parts as well as with gripper interchange magazines for the specific pre-fabricated part grippers. Both the interchange station for the pick-up and clamping device and the gripper interchange magazines for the grippers are arranged at the outer edge of the plant components, forming an equipment cluster, of turntable, processing robots, gripper interchange magazines and pre-fabricated part magazines, so that they can be supplied from outside with pick-up and clamping devices and grippers.

With the manufacturing plant according to the invention various types of assemblies of vehicle bodies can be produced simultaneously. Theoretically the number of types which can be produced on the manufacturing plant is unlimited. By "simultaneously" one understands not only a complete mix, that is to say all the different types are produced with constant alternation, but also production, wherein initially only a first type is produced and then a second type and then a third type and so on, which is called "batch production". Such multi-flexibility of the manufacturing plant relies on the fact that the core section of the plant remains unchanged for all types, while the part-specific plant components are replaced as required. Since the components specific to the type of pre-fabricated part are supplied from outside, the number of types to be produced simultaneously is arbitrary. The supply of the components specific to the type of pre-fabricated part from outside also means with routine operation of the manufacturing plant that workers, who procure the components from outside do not have to enter the danger zone of the manufacturing plant.

In order to be able to perform joining operations on assemblies held on the working locations of the turntable, processing robots are usually arranged outside the turntable. However in order at the same time to also be able to perform joining operations on the inside of the assemblies, a further processing robot can be arranged in the middle of the turntable or approaching from above that is to say sweeping over the pick-up and clamping device.

The equipping from outside of the pick-up and clamping devices specific to the type of pre-fabricated part and the associated grippers is facilitated if the interchange station is set up for simultaneous uptake of the pick-up and clamping devices and the associated grippers. In the case of this arrangement the associated processing robot can then remove the gripper from the pick-up and clamping device already held in the turntable and transfer it to the gripper interchange magazine.

If batch production takes place on the plant, that is to say the pick-up and clamping device and the grippers do not need to be changed constantly, a simple interchange station, by which the pick-up and clamping device can be equipped with the associated gripper directly from outside, is sufficient for re-equipping a working location. If however frequent changes are necessary for the different types, such a change can be accomplished more easily with an interchange station for the pick-up and clamping devices, which is designed as exchange turntable with several storage locations. The change of pick-up and clamping device and gripper on a working location of the turntable is then unconnected with a change of pick-up and clamping device with gripper from outside.

Preferably the exchange turntable has a unit, which can be replaced by the turntable with working locations, in particular a telescopic or pivoting push or swing unit for the pick-up and clamping devices. In this way vibration-free changeover is possible. The joining operations therefore do not need to be interrupted for this.

A manufacturing plant, which is designed not just with a single production line but with a dual production line, is particularly advantageous. Such a plant can be realized according to one embodiment of the invention with configuration of the different plant components in mirror image, by the processing robots, set up for joining operations, being arranged on a common turntable between the turntables with working locations. Such a manufacturing plant is particularly advantageous, although not exclusively, for simultaneous production of two different types (for example right-hand/left-hand parts) of assemblies.

According to another embodiment of the invention a finishing station with at least one interchangeable gripper for specific types of pre-fabricated part and at least one processing robot for joining operations is arranged between an unloading station for the joined assemblies and the turntable or turntables with the working locations. The final joining operations can be performed in this finishing station, possibly while the assembly is completed with further pre-fabricated parts, which could not be carried out in the turntables with the working locations.

In the case of dual production lines the finishing station should have two processing robots for joining operations on a turntable and two grippers for specific types of pre-fabricated parts facing these in mirror image.

The finishing station is assigned a processing robot, which is set up for drawing the finished assemblies including grippers holding them, from the finishing station and for separate placement of the assemblies in a pre-fabricated part magazine and the gripper in an automatic gripper changer.

BRIEF DESCRIPTION OF THE DRAWINGS

The invention is described below in detail on the basis of a drawing, which shows a manufacturing plant in plan view by way of schematic illustration.

DESCRIPTION

The illustrated manufacturing plant is designed with a dual production line. It comprises two turntables 1, 2, which can be interchangeably equipped in each case on three working locations 3, 4, 5, 6, 7, 8 with prefabricated part-specific pick-up and clamping devices 9, 10, 11, 12, 13, 14 for assemblies of vehicle bodies, for example side panels. If the clamping devices 9 to 14 are designed for various types of assemblies, a maximum of 6 types of assemblies can be produced simultaneously without changing the equipment of the working locations 3 to 8.

A center processing robot 15a, 15b is arranged in the center of the turntable 1, 2 for joining operations on the assemblies. A further turntable 16, which is equipped with two processing robots 17, 18 for further joining operations on the assemblies of the turntable 1, 2 held by the pick-up and clamping devices 9 to 14, is positioned between the turntables 1, 2. The processing robots 17, 18 can perform a pivotal turn on the turntable 16. While the processing center robots 15a, 15b are designed for joining operations on the inside of the assemblies, or approaching from above, that is to say sweeping around the pick-up and clamping device, the processing robots 17, 18 are intended for joining operations on the outside of the assemblies. The arrangement of the processing robots 17, 18 on the turntable 16 on the one hand and their capacity to pivot on the other hand renders the possibility of positioning them optimally for joining operations on both assemblies in turntable 1 and also on assemblies in turntable 2.

Each turntable 1, 2 is assigned an interchange station 19, 20 for pick-up and clamping devices specific to the type of pre-fabricated part. The interchange station 19, 20 are designed as turntables and in each case comprise four storage locations 21, 22, 23, 24, 25, 26, 27, 28, of which three storage locations 21 to 23, 25 to 27 are equipped with pick-up and clamping devices 29, 30, 31, 32, 33, 34 specific to the type of pre-fabricated part. The fourth empty storage location 24, 28 serves for taking up a no longer required pick-up and clamping device of turntable 1, 2.

A finishing station 35, which comprises a turntable 36 with two processing robots 37, 38 rotatably mounted thereon is located next to the turntable 16 with the two processing robots 17, 18 for joining operations. Two stationary but interchangeable grippers 39, 40 for specific types of pre-fabricated parts are arranged on either side of the turntable 36 for the generally completed assemblies coming from turntables 1, 2. The interchangeable grippers 39, 40 can be drawn from an automatic gripper changer 44. In the finishing station 35 further pre-fabricated parts from a pre-fabricated part magazine 41 can be inserted into these for completion of the assemblies.

A processing robot 42, which takes the grippers 39, 40, together with the assemblies of the finishing station 35, places the assemblies in an unloading station 43 and if necessary, due to other types of assemblies, changes the grippers 39, 40 in the automatic gripper changer 44, serves for drawing the further pre-fabricated parts from the pre-fabricated part magazine 41 and the final assemblies from the finishing station 35. The automatic gripper changer 44 also contains suitable grippers for any further pre-fabricated parts with which the processing robot 42 may be loaded.

Each turntable 1, 2 with its working locations 3-8 is assigned a pre-fabricated part magazine 45, 46 with storage locations 47, 48, 49, 50, 51, 52 specific to the type of pre-fabricated part. A processing robot 53, 54, which can move linearly between magazines 45, 46 and turntables 1, 2 serves for loading the pick-up and clamping devices 9-14 with prefabricated parts from magazines 45, 46. A stationary joining station 55, 56, with which initial joining operations can be performed on the pre-fabricated part held by the processing robot 53, 54 is arranged on the travel of said processing robot 53, 54.

Processing robots 57, 58 serve for handing over generally completed assemblies at the working locations 3 to 8 of the turntables 1, 2 to the finishing station 35. In order to be able to equip the processing robots 57, 58 with different grippers for the various types of assemblies, they are each assigned a gripper interchange magazine 59, 60 designed as a turntable. These gripper interchange magazines 59, 60 are loaded with precisely the no longer required grippers, which the processing robots 57, 58 remove from the pick-up and clamping devices 9 to 14 of turntables 1, 2.

The linearly displaceable processing robots 53, 54, with which the various types of assemblies are taken from the pre-fabricated part magazines 46, 47 and handed over to the pick-up and clamping devices 9 to 14 of the turntables 1, 2, are assigned gripper interchange magazines 61, 62 likewise designed as turntables.

The entire manufacturing plant with its components 1, 2, 16, 19, 20, 41 to 46, 53, 54, 57 to 62, forming an equipment cluster, is surrounded by a safety guard G. It is only accessible at a few places, where plant components specific to the type of pre-fabricated part, such as grippers and pick-up and clamping devices or smaller pre-fabricated parts, must be introduced into the equipment cluster via gates T1, T2, T3, T4, T5, T6, T7, T8, so that workers do not have to enter the internal danger zone of the equipment cluster during routine production in order to equip the individual components for the specific type of pre-fabricated part and to feed in prefabricated parts. All work is performed outside the equipment cluster. Inside the cluster the plant components operate "autonomously".

With the configuration illustrated in the drawing six different types can be produced on the plant both in the upper and as well as in the lower line, without further components having to be supplied from outside. Thus the turntables 1, 2 are already equipped with pick-up and clamping devices 3 to 12 for three various types of assemblies in each case. If a further type is to be produced, the no longer required pick-up and clamping device, for example the clamping device 11, 13 together with its gripper taken by the processing robot 57, 58 possibly from the gripper interchange magazine 59, 60 is transferred by means of a not illustrated loading table from the turntable 1, 2 to the empty storage location 24, 28 of the interchange station 19, 20. After rotation of the interchange station 19, 20 the necessary new pick-up and clamping device, for example 29, 34 together with the associated gripper can then be transferred to the turntable 1, 2 by means of the loading table. The gripper is then removed from the pick-up and clamping device and possibly placed in the gripper interchange magazine 59, 60 by means of the processing robot 57, 58. If the pick-up and clamping device 11, 13 taken from the turntable 1, 2 is absolutely no longer required, it can be removed out of the interchange station 19, 20 through a loading machine operated by a worker via the opened gate T1, T2 and the storage location can be equipped with a new pick-up and clamping device for a new type, which is needed next. The new pick-up and clamping device is transferred to the interchange station from outside through the loading machine operated by the worker via the opened gate T1, T2.

The pick-up and clamping devices 9 to 14 of the turntables 1, 2 are loaded with various types of assemblies from pre-fabricated part magazines 45, 46 by means of the processing robots 53, 54. For this purpose said processing robots 53, 54 can be equipped with the suitable grippers from gripper interchange magazines 61, 62. The gripper interchange magazines 61, 62 are loaded with various types of grippers from outside via the opened gates T3, T4 by a worker. Further pre-fabricated parts can be added if necessary to the incomplete assemblies held by pick-up and clamping devices 9 to 14 through workers via adjacent gates T5, T6. Initial joining operations can be performed on assemblies en route to the turntables 1, 2 at the stationary joining stations. The main joining operations however are performed on assemblies held by the pick-up and clamping devices 9 to 14 through the central processing robots 15a, 15b and the outside processing robots 17, 18. For this purpose the processing robots 17, 18 are optimally positioned on their turntable 16 for the assemblies to be joined together. Optimum positioning is possible since the processing robots 17, 18 can be pivoted not only around their own axis of rotation but also on the turntable 16, so that the correct joining tools are also in the proper position for the assemblies.

After completion of joining the processing robots 57, 58 with suitable grippers drawn from the gripper interchange magazines 59, 60 take the assemblies alternately from the pick-up and clamping devices 9 to 14 of the turntables 1, 2. While the processing robot 58 takes an assembly from the pick-up and clamping device 14 for example, joining operations still continue on the assembly aligned to the processing robots 17, 18 correctly for joining. The assemblies taken are transferred to the stationary grippers 39, 40 in the finishing station 35, where they are finally joined together if necessary after completion with further pre-fabricated parts from the pre-fabricated part magazine 41 by means of the processing robots 37, 38. Also in this case the processing robots 37, 38 because of rotation of the turntable 36 and their ability to pivot on the turntable 36 can be optimally positioned for the assembly held by the grippers 39 or 40. After final completion the processing robot 42 takes the assembly together with grippers 39, 40 from the finishing station 35 and places the assembly in the unloading station 43. Depending upon the type of assembly to be taken accordingly from the finishing station 35, the processing robot 42 keeps the gripper or exchanges it in the automatic gripper changer 44.

The invention claimed is:

1. A multi-flexible manufacturing plant for assemblies, to be joined together from several pre-fabricated parts, of vehicle bodies or body components, comprising a turntable, on which pick-up and clamping devices for similar and/or various types of assemblies are interchangeably arranged at several working locations, having an interchange station, arranged next to the turntable with which a pick-up and clamping device for a first type of assembly on the turntable can be replaced by a pick-up and a clamping device for another type of assembly, including several processing robots for joining operations with several processing robots, which can be fitted with grippers for specific types of pre-fabricated parts in order to draw prefabricated parts from pre-fabricated part magazines and to load and unload the pick-up and clamping devices with these pre-fabricated parts, as well as gripper interchange magazines for specific pre-fabricated part grippers, wherein both the interchange station for the pick-up and clamping devices and the gripper interchange magazines for the grippers are arranged at an outer edge of the components, forming an equipment cluster, of turntable, processing robots, gripper interchange magazines and prefabricated part magazines, so that they can be supplied from outside with pick-up and clamping devices and grippers; and wherein a center processing robot for joining operations is positioned in the center of the turntable with working locations.

2. The manufacturing plant according to claim 1 wherein the interchange station is set up for simultaneous uptake of the pick-up and clamping devices and associated grippers.

3. The manufacturing plant according to claim 1, wherein the interchange station for the pick-up and clamping devices comprises an exchange turntable with several storage locations.

4. The manufacturing plant according to claim 3, wherein the exchange turntable has a tool exchanger unit cooperating with the turntable with working locations for changing the pick-up and clamping devices.

5. The manufacturing plant according to claim 1 wherein, with configuration of different plant components in mirror image, the processing robots set up for joining operations are arranged on a common turntable between the turntables with working locations.

6. The manufacturing plant according to claim 1 wherein a finishing station with at least one interchangeable, gripper for specific types of pre-fabricated parts and at least one processing robot for joining operations is arranged between an unloading station for the completed assemblies and the turntable and/or turntables with working locations.

7. The manufacturing plant according to claim 6, wherein the finishing station has two processing robots for joining operations on a turntable and two grippers for specific types of pre-fabricated parts facing these in mirror-image.

8. The manufacturing plant according to claim 6, wherein the finishing station is assigned a processing robot, which is set up for drawing the finished assemblies including grippers holding them from the finishing station and separate placement of the assemblies in a prefabricated part magazine and of the grippers in an automatic gripper changer.

9. The manufacturing plant according to claim 8, wherein the finishing station is assigned a pre-fabricated part magazine, from which further pre-fabricated parts can be drawn with the processing robot and inserted in the grippers for specific types of pre-fabricated parts.

* * * * *